United States Patent [19]
Wood

[11] Patent Number: 5,511,980
[45] Date of Patent: Apr. 30, 1996

[54] TALKING PHONICS INTERACTIVE LEARNING DEVICE

[75] Inventor: Michael C. Wood, Moraga, Calif.

[73] Assignee: Leapfrog RBT, L.L.C., Berkeley, Calif.

[21] Appl. No.: 200,609

[22] Filed: Feb. 23, 1994

[51] Int. Cl.⁶ .................................................. G09B 5/00
[52] U.S. Cl. .......................... 434/169; 434/157; 434/167; 434/201; 434/327
[58] Field of Search .................................... 434/156, 157, 434/159, 167, 169, 178, 185, 307 R, 308, 317, 201, 259, 322, 323, 327, 334, 337, 350, 362, 365; 446/143, 397; 341/34; 40/409, 411, 427; 273/236–239, 272

[56] References Cited

U.S. PATENT DOCUMENTS

| | | | |
|---|---|---|---|
| 3,768,179 | 10/1973 | Woodford et al. | 434/308 |
| 4,348,191 | 9/1982 | Lipsitz et al. | 434/308 |
| 4,729,564 | 3/1988 | Kuna et al. | 434/335 X |
| 5,188,533 | 2/1993 | Wood | 434/339 X |
| 5,334,022 | 8/1994 | Kitagawa et al. | 434/327 X |
| 5,356,296 | 10/1994 | Pierce et al. | 434/339 X |
| 5,364,272 | 11/1994 | Herman et al. | 434/327 X |

OTHER PUBLICATIONS

"Verbal communication aid for nonvocal patients" by Friedman et al, Medical & Biological Engineering & Computing, Jan. 1979, pp. 103–106.

"82 C–based key–to–speech synthesizer gives stroke victims a voice" by Sam Davis, EDN, Jan. 20, 1978, pp. 19–21.

Primary Examiner—Joe Cheng
Attorney, Agent, or Firm—Graham & James

[57] ABSTRACT

An interactive learning device in the form of an open book for toddlers and preschoolers, having a plurality of embodiments. In one embodiment the book has three-dimensional letters of the alphabet received by a card that spells a word. The card is adapted to be placed in the book and a speech processor circuit recites the word written therein and sounds the phonic associated with each phoneme in the word when the child places the correct alphabet letters in the card, and repeats the entire word. In a second embodiment the book acts as a simple translator. In a third embodiment the book is in the form of a talking math calculator that teaches elementary mathematical operations. In a fourth embodiment the child may learn the sounds and names associated with various animals, and may also translate the animal names. A plurality of shapes and colors may also be represented by cards and indica bearing units.

38 Claims, 5 Drawing Sheets

TALKING PHONICS INTERACTIVE LEARNING DEVICE

BACKGROUND OF THE INVENTION

Children learn letters, numbers and the name of various objects by audible repetition accompanied with visualization of the object. Often, a parent or teacher will read a book aloud while pointing to the object depicted by the word which is read. In this way, the child is able to visually associate the object with its name. This method of teaching is generally passive, i.e., there may be little interaction between the child and subject matter. Interactive teaching methods using multiple sensory perceptions are more effective than mere memorization.

Voice synthesizers are used as communication devices for disabled adults. One such example is described in *Medical & Biological Engineering and Computing*, January 1979, titled "Verbal Communication Aid for Non-Vocal Patients." This article describes a voice synthesizer to speed communication for speech impaired patients. Each device includes a keyboard networked via a commercial telephone by a wire connection to a central voice generating system. The use of the central system permits many individual boards to employ a single-control unit, thereby reducing the to total cost of each device. In this way, a number of boards in a single geographic area can utilize the same control unit. This device may additionally be used as a teaching or translation aid. In such an application, the keys are covered with letters or numbers and, when depressed, produce a voice response. This device is advantageous in that a child may use the device interactively alone, without close supervision. The parent or teacher can then attend to other matters. However, the keys are substantially identical, the differences appearing only in a typed letter on each key. An article title "μ C-Based Key-to-Speech Synthesizer Gives Stroke Victims A Voice" *EDN Design News* Feb. 20, 1978) by Sam Davis discloses a system for producing the basic sounds of speech. Each spoken word is broken into phonemes to simulate a word. This system uses phonemic command words to control a synthesizer. Other devices use voice synthesis devices for various purposes. U.S. Pat. Nos. 4,357,489 to Henderson, assigned to Texas Instruments Incorporated, and 4,689,811 to Kroon each disclose an integrated circuit for synthesizing speech. U.S. Pat. No. 4,646,350 to Batra employs such an integrated circuit in a child's shoe to provide an audible message when opening or closing the shoe.

Prior art devices of the kind mentioned above, however, fail to provide meaningful visual indicia attractive to children which can facilitate learning when incorporating voice synthesis devices.

In U.S. Pat. No. 5,188,533 to Michael C. Wood, there is a significant advance made in the art to overcome some of the deficiencies noted above. This invention further builds and improves on the advances made in the Wood '533 patent. The device described herein provides many advantages over prior art devices in such a way as to invite interaction with children and facilitate the learning process for speaking, reading and memorization.

SUMMARY OF THE INVENTION

The present invention generally relates to an interactive learning device having electronic circuitry for generating an audible sound in response to touch contact with the device. More specifically, the device relates to an interactive learning device having one or more preferably touch sensitive and detachably secured three dimensional indicia bearing units, each representing a letter or number which, upon touching, activates voice synthesis circuitry to audibly produce the name or phonetic sounds associated with the indicia bearing unit. Thus, a user can establish a relationship between the symbols of letters or numbers represented by the indicia bearing unit to the sounds and names associated with those symbols. In addition, the device is fun to use by toddlers and preschoolers.

The present invention includes an indicia bearing housing having a speech processor (or voice synthesis circuitry) electrically coupled to an amplifier and speaker. The indicia bearing housing houses one or more three dimensional indicia bearing units, each operatively engaged to a switch, preferably a touch sensitive surface switch, underlying the indicia bearing units. The touch sensitive surface is electrically coupled to the voice synthesis circuitry to activate the synthesis processor upon user contact. Touching an indicia bearing unit produces an audible synthesized voice representing an assigned sound or phoneme. The phoneme, one of the smallest units of speech, represents the name or phonetic sound associated with the indicia bearing unit. For example, the letter "a" would have a phonetic assigned to the letter "a".

The present invention further provides for an "open book" format, or more generally an indicia bearing unit, housing a plurality of indicia bearing units held by the left hand side of the book, and a card or template receiving portion on the right side of the book that receives a card or template. The indicia bearing unit on the left hand side may be removably held and may each overlie a touch sensitive switch, while on the right hand side there would lie the card, held by the card receiving portion.

In one embodiment, called the "talking dictionary" or "talking words" embodiment, a plurality of cards, each card having a word and picture associated with the word, are placed over the card receiving portion of the book. The electronic circuitry in the book is able to recognize what particular card has been placed in the book, and recites aloud the word depicted therein. At the bottom of the card receiving portion are a plurality of keys or switches, preferably no more than five, underlying the card under cut-out outlines of letters that spell out the word depicted in the card. The child then removes the letter indicia bearing unit that corresponds to the cut-out outline from the left hand side of the book, and places it in the matching cut-out portion in the card, thereupon activating the speaker to recite the phonic associated with the indicia bearing unit so placed, in the context that the phonic is associated with the word it is in. In this way the child receives multiple feedback in learning the word: once from the picture on the card associated with the word, once from the word being recited aloud when the card is placed in the book, and once when the keys are depressed when the indicia bearing unit are matched with the cut-outs.

In another embodiment of the invention, similar to the preceding embodiment, called the "translator" embodiment, the book may be used as a simple translator to translate words to and from English and a foreign language. The cards display both an English word and its corresponding foreign language equivalent. When the card is placed over the card receiving portion of the book, the English word and its foreign equivalent are both recited, and when one of the five keys of the phonetic associated with the foreign and/or English word are depressed. A switch on the book allows for the selection of any number of foreign languages.

In another embodiment of the present invention, called the "talking calculator" embodiment, the book takes the form of a calculator, whereupon the letters on the left hand side of the book are replaced by non-removable numbers, and the cards received by the card receiving portion on the right hand side of the book depict elementary mathematical operations, such as the addition of two integers. Upon the placing of the card into the book, the speech synthesizer chip may recite the elementary formula depicted on the card and upon the depressing of the correct keys associated with the formula the chip recites the phonetic associated with the key.

In yet another embodiment of the present invention, called the "menagerie" embodiment, there is depicted a plurality of animal cutouts on one or more cards, such that when an indicia bearing unit from the left hand side of the book is placed in its matching cutout, the book will utter the characteristic animal sound associated with the animal, and recite the animal's name.

Yet another aspect of the present invention is the use of a chip employing voice compression of a human voice onto an inexpensive voice synthesis chip having a minimum of memory.

DETAILED DESCRIPTION OF THE PREFERRED EMBODIMENTS

Figure 1:
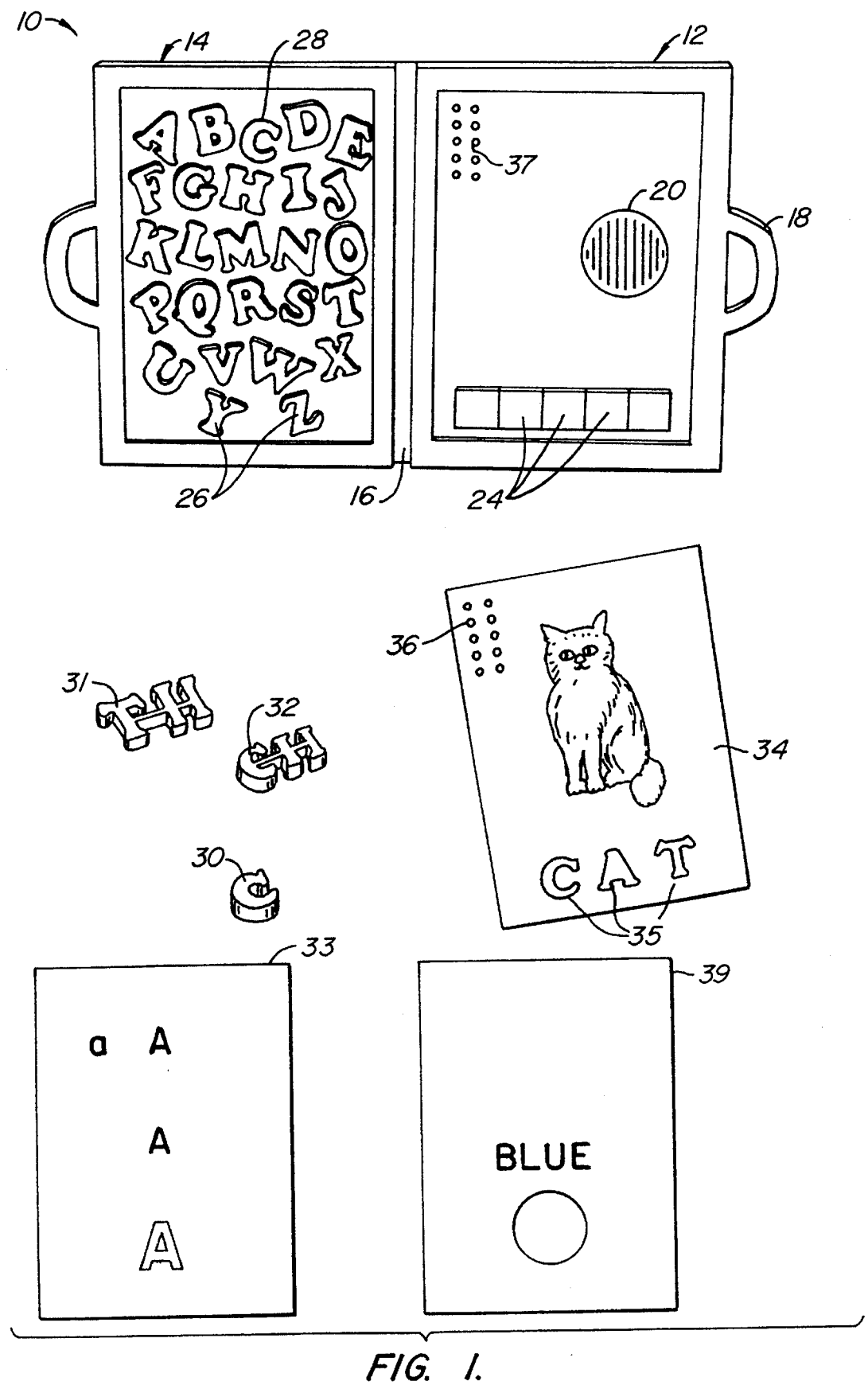
FIG. 1 is a perspective view of one embodiment of the present invention, the "dictionary" embodiment, showing the book in laid open form, with a card outside the book.

Turning attention now to FIG. 1, there is shown a schematic view of one embodiment of the present invention. There is shown a talking book 10 having a right hand portion 12 and a left hand portion 14, with a living hinge 16 connecting the two sides. A pair of handles 18 provides a way of carrying the book when it is closed. The book includes a battery door on the front side for housing a power supply, a readily accessible power supply switch, and a speaker 20. A plurality of push-button keys or switches 24 (preferably no more than five) are found at the bottom of the right hand portion 12. The book may be made of a durable plastic material, in bright colors and with rounded corners for enhanced safety. A plurality of three dimensional indicia bearing units 26 are removably held in cutout indicia bearing unit seats or recesses on the left hand portion, such as recess 28 at the letter "C", which has been removed and shown at reference no. 30. The recesses may be formed in a manner as taught by U.S. Pat. No. 5,188,533, incorporated by reference herein. The same manner of holding the indicia bearing units may be employed in all embodiments of the present invention. The indicia bearing units may be magnetically held as well. Each indicia bearing unit seat is shaped to conform with the outline of the specific symbol represented by the indicia bearing unit, and to secure the indicia bearing unit. In addition to letters A through Z, the left hand side of the book may hold digraphs such as "th", "ch", "ea", "ph", and so on. The digraphs are two letters held by a connecting portion therebetween, as shown. A card would have a corresponding cut-out recess to hold the digraph. Furthermore, the "silent e" may be represented by an indicia bearing unit that is made of clear plastic in the form of the letter "e".

Each indicia bearing unit is connected to or activates an underlying switch. The switch may be activated by any of the ways taught in U.S. Pat. No. 5,188,533, incorporated by reference herein. These switches may be used in all embodiments of the present invention. For instance, the indicia bearing unit may have a touch sensitive surface that uses radio frequency means to relay that it has been touched; the indicia bearing unit may overlie a touch sensitive switch, or the switch may be any kind of switch that uses contact with or proximity to the indicia bearing unit in order to become activated.

A plurality of cards may be employed with the talking book, such as cards 33, 34 and 39. Card 34 shows a picture of a cat with the cut-out letters for cat underneath the picture. Other cards may have representations of letters of the alphabet with an appropriate cut-out, such as card 33, or representations of colors, such as card 39, which may be colored and with a cutout to receive an indica bearing unit. In addition, a plurality of geometric shapes may be represented by indicia bearing units, such as a figure of a star, a triangle, a square or a circle. Indeed, the representations shown by the cards and the indica bearing units are not limited by what is shown in the accompanying drawings but can include any type of graphical representation, printed indicia or numerical representation, or any combination thereof.

Each card, such as card 34, may be uniquely identified by the processor. In one embodiment, each card has on its upper left corner a unique signature that identifies the card and its contents. The signature may be a plurality of pin holes 36 that are received by mating pins 37 in the card receiving portion of the book. The presence or absence of a pin hole can encode information about the identity of the card. For example, with eight pins and using one bit for each pin, up to $2^8=256$ different cards may be uniquely identified in this manner by the speech processor circuitry inside the book. Other means for identifying the card may be used, such as the use of magnetic encoding and readers.

Figure 2A:
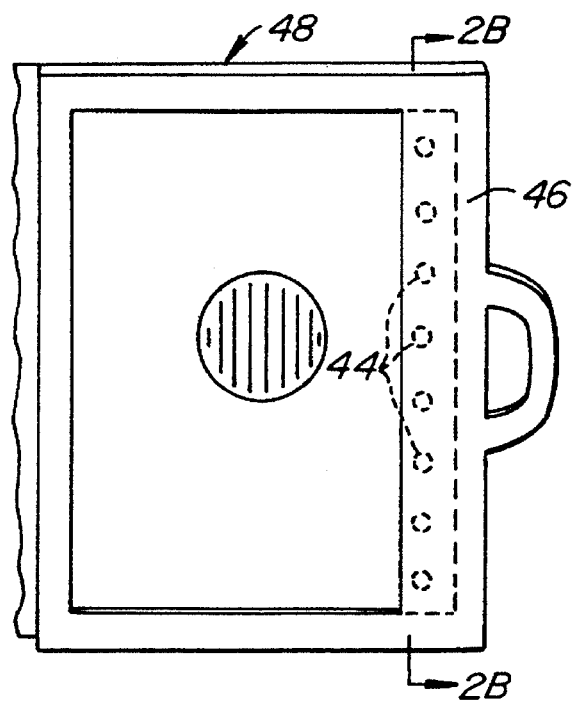
FIGS. 2A–2C show another embodiment of the card receiving portion of the book.
Figure 2B:
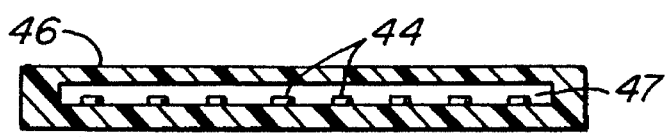
Figure 2C:
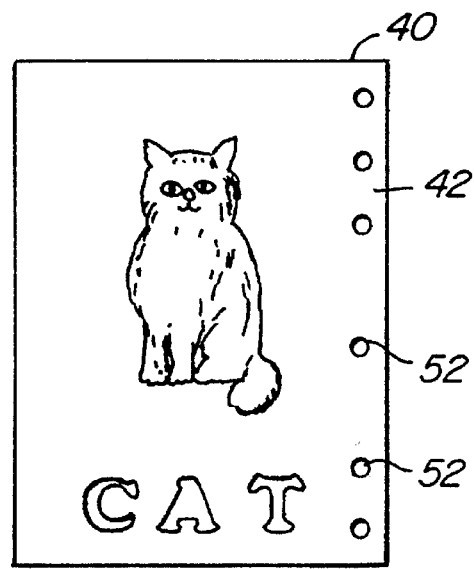

By way of another example, as shown in the FIGS. 2A–2C, the cards may be slideably received by the card receiving portion, and the identifying marks may be the presence or absence of eight cutaway portions or apertures on the right-most edge of the cards. Thus, there is shown a card 40 having a serrated edge 42 and a template receiving portion of a book having this alternate means to the use of pins for recognizing a card. A plurality of rounded keys 44 are each positioned near the edge 46 of the right hand portion of the card receiving means 48, and are spring biased upwardly. The card is received by this keyed edge and read, analogous to the way a punch card is read. The card has up to eight punched out tabs or apertures 52 on its right side. The number of punched out tabs identifies the card. Thus, with eight apertures and one bit per key, up to $2^8=256$ cards may be identified by the book's processor. The number of punched out tabs are ascertained when the card is inserted. By periodically polling the keys and finding which ones are depressed, the processor of the talking book can easily thus identify the card.

The operation of the "talking dictionary" embodiment of the present invention will now be explained as follows. The talking book is powered on and opened. On the left-hand portion are a plurality of removable indicia bearing units 26, overlying keys, on the right hand portion is the card-receiving portion 12, the speaker 20, and five keys 24 at the bottom. A child takes out a card 34 that has on it a some combination of phonetics that may comprise a simple word. For purposes of illustration, suppose that word is "cat". Card 34 has on it a color picture of a cat, and at the bottom are cut-out outlines of the letters "c-a-t", shown as reference numbers 35. These cut-out outlines 35 will overlie three out of the five pushbutton keys 24 at the bottom of the card receiving portion. The child places card 34 on the right-hand portion 12 of the book, face up. In the embodiment of the book that employs eight pins as the card identifying means, as depicted in FIG. 1, the child will align card 34 so that holes 36 on the left-upper most part of the card will receive pins 37. In the embodiment of the book that employs a plurality of keys on the right-most edge of the card-receiving portion, as depicted in FIG. 2A, the child will align the card so that the serrated right edge 43 of card 40 fits into the slot 47 provided, as shown in FIG. 2B. Either way, when the card has been properly inserted the processor will recognize the card and recite the name associated with the card, here, the word "cat". Thereupon the processor will wait for the child to remove an indicia bearing unit from the left portion of the book and place it into the proper cutout on the card. The child must place the indicia letters "c", "a", "t" in sequence, in the proper matching cutouts, or the book will remain silent or optionally an error message will be sounded. If the child places the first indicia letter "c" correctly, into the cutout reserved for the letter "c" on the card, the processor will sound the phoneme "c", as "c" is pronounced in "cat". To further illustrate this point, if the word was "coat", the phoneme "c" would be pronounced differently than the "c" in cat. The processor would store all the phonemes associated with each stored word, in compressed Linear Predictive Coding (LPC) form, as described herein, and the association between phoneme and stored word would be software controlled. Next, the indicia letter "a" would have to be placed in the cutout for letter "a" to depress the underlying switch and sound the phonic for "a" in the word "cat". Likewise, placing "t" would sound the "t" in cat. When the last letter has been placed, the processor may recite the entire word again. Furthermore, the indicia units 26 on the left hand side are attached to underlying switches or keys that are operatively coupled to the processor to cause the processor to recite the letters of the alphabet when the keys are depressed. Thus a child may learn the alphabet even in the absence of using cards.

In addition to alphabet letters, the indicia bearing units may represent colors, such as the primary colors, and the speech processor circuit may recite the colors in a similar manner to the recitation of letters. Also phonemes such as the "silent e", some short vowels and hard consonants may have keys associated with them. Other modifications and variations may be readily apparent to those skilled in the art, in view of the teachings disclosed herein.

Another embodiment of the invention, the "translator" embodiment, is a version of the FIG. 1 embodiment that includes the storage of numerous foreign words mapped in a one to one fashion with their english equivalents. Thus, by activating a suitable switch, the child may translate the word into a number of languages, such as English to Spanish, English to French, and so on. Suitable cards may be provided with this embodiment to allow children to learn foreign words from pictures.

Operation of this "translator" embodiment would be exactly the same as the operation of the "talking dictionary" embodiment above, except that by toggling a switch to a particular foreign language, the processor would be instructed to recite both the english and/or foreign language equivalent of the word, as well as the english and/or foreign language phonic, whenever a key is depressed.

Figure 3A:
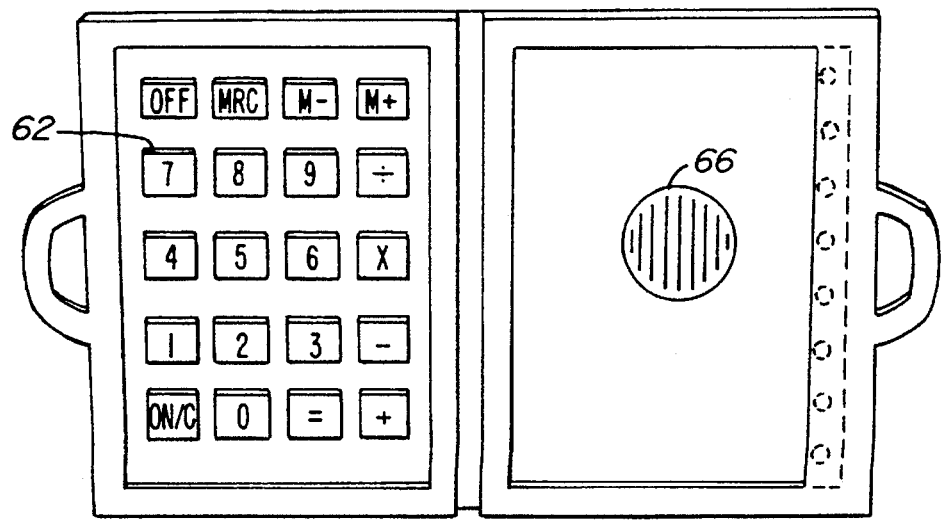
FIG. 3A is a view of another embodiment of the present invention, the "talking calculator" embodiment, showing the book in laid open form.
Figure 3B:
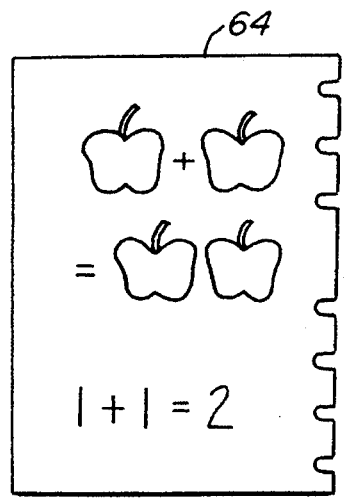
FIG. 3B shows a card associated with the FIG. 3A embodiment.

Turning attention now to FIGS. 3A and 3B, there is shown the "talking calculator" version of the present invention, where a plurality of buttons 62 representing the layout of a typical math calculator are arrayed on the left hand side, and on the right hand side the card receiving portion is ready to receive a serrated card 64. The card depicts therein a typical math problem, pictorially displayed, such as 1+1=2, shown graphically by two apples, as depicted in FIG. 3B. Here the card is identified by its serrated edge, with the card identifying device as in the FIG. 2A embodiment, although in principle another card identifying device, such as the one shown in the FIG. 1 embodiment, may be employed. When the card 64 is inserted into the card receiving portion, the card is read by the processor in the book at its serrated side and the processor knows which math problem is being displayed, and optionally recites in words the math problem. The child then obtains additional feedback by depressing the numbers on the left hand side of the book, and the processor recites the number depressed through speaker 66. If a wrong key is pressed, the processor may optionally emit an error message or tone. This version of the invention dispenses with the five keys at the bottom of the card receiving portion of the book.

Figure 4B:
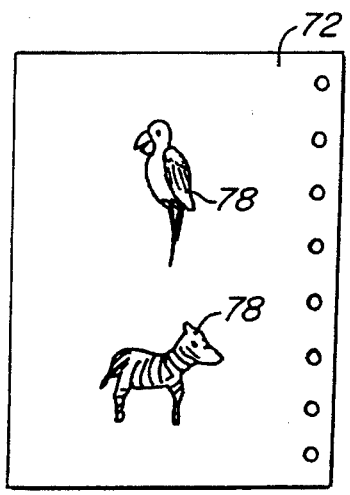
FIG. 4B shows a card adapted to be used in the FIG. 4A embodiment.
Figure 4A:
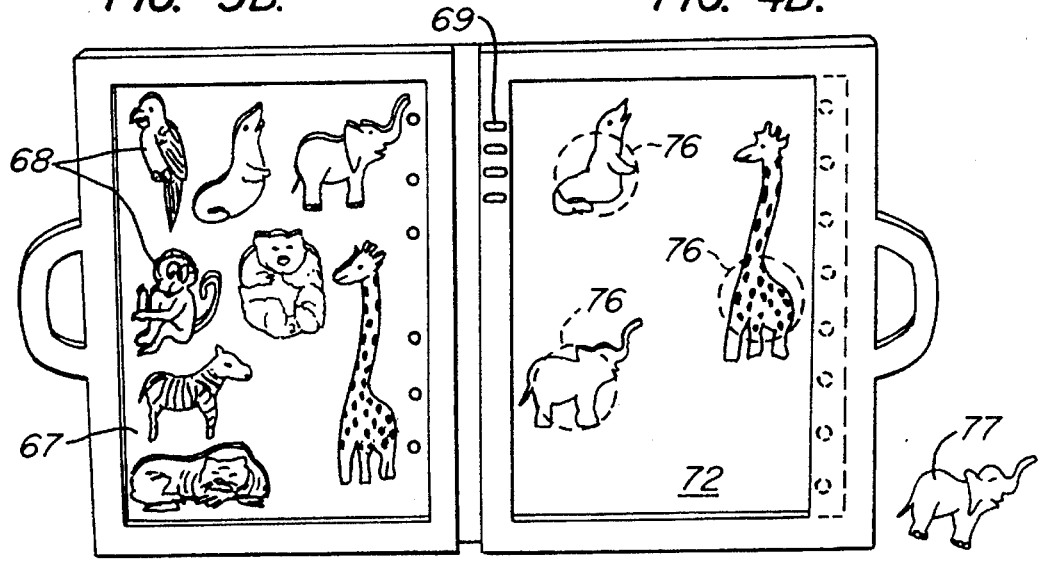
FIG. 4A is a perspective view of another embodiment of the present invention, the "menagerie" embodiment, showing the book in laid open form, with a card inserted therein on the right hand portion.

FIG. 4A shows another version of the present invention, the menagerie version, showing a plurality of animals 68 that are removably supported on the left hand side of book on a card. The left hand portion of the book is for storage of cards alone, and does not house switches underlying the cards. A plurality of cards may be stored on the left hand portion. On the right hand side of the book, a card 72 has been inserted into the card receiving portion. A plurality of switches 76 underlie the card at certain predetermined points under the card. The card itself has a plurality of animal cutouts 78 displayed therein, each of these cutouts overlying one of the plurality of switches. After the card has been inserted and the processor recognizes which animal cutouts overlie which switches (by recognizing the particular card inserted), the child then may remove an animal indicia bearing unit from the card. The processor may optionally recite the animal's name and/or generate a characteristic sound associated with the animal. A similar thing can happen when the indicia bearing unit representing an animal, such as elephant indicia bearing unit 77, is replaced back into its associated cutout at 76. That is, the processor may activate the speaker to recite an animal sound, stored in memory, that is associated with the animal placed. Thus, placing the "elephant" indicia bearing unit into the cutout of an elephant on the card, will activate the speaker to sound a characteristic elephant trumpeting. The word for "elephant" may be pronounced as well. Likewise placing a duck into the correct cutout will make a quacking sound, placing a horse or zebra will make a neighing sound, placing a pig will make an "oinking" sound, placing a chicken will make a clucking sound, placing a bird will make a chirping sound, placing a frog will make a croaking sound, and so forth, each sound characteristic of the animal being placed into the cutout. Attempting to place an incorrect animal into the cutout reserved for a particular animal will register no sound, or optionally an error message. Regardless of this, an attempt to place an incorrectly sized animal unit into an animal cutout on the right hand side will probably not depress a key because of the incongruence between the shape selected and the shape of the cutout in the card.

In addition, numerous cards, each having a plurality of animal cutouts associated therein, may be separately sold from the FIG. 4A embodiment. This is true of all the embodiments.

Furthermore, the FIG. 4A embodiment may have a plurality of switches 69 on the housing of the book so that a user may select a predetermined foreign language for the animal names to be recited in. Optionally the names may be recited in English and another foreign language, such as French, Spanish and Japanese.

Other modifications and variations may be readily apparent to those skilled in the art, in view of the teachings disclosed herein.

The speech processor circuitry that forms part of the first embodiment of this invention will now be described. The following implementation is but one of many possible implementations, as is readily apparent to those skilled in the art. The following circuitry is for illustrative purposes only. Similar circuitry, suitably modified, may be employed in the other embodiments of the present invention, but such circuitry should not be viewed as limiting the invention, as numerous other electronic implementations may be employed by one skilled in the art without departing from the scope of the invention as disclosed, taught and claimed herein.

Figure 5:
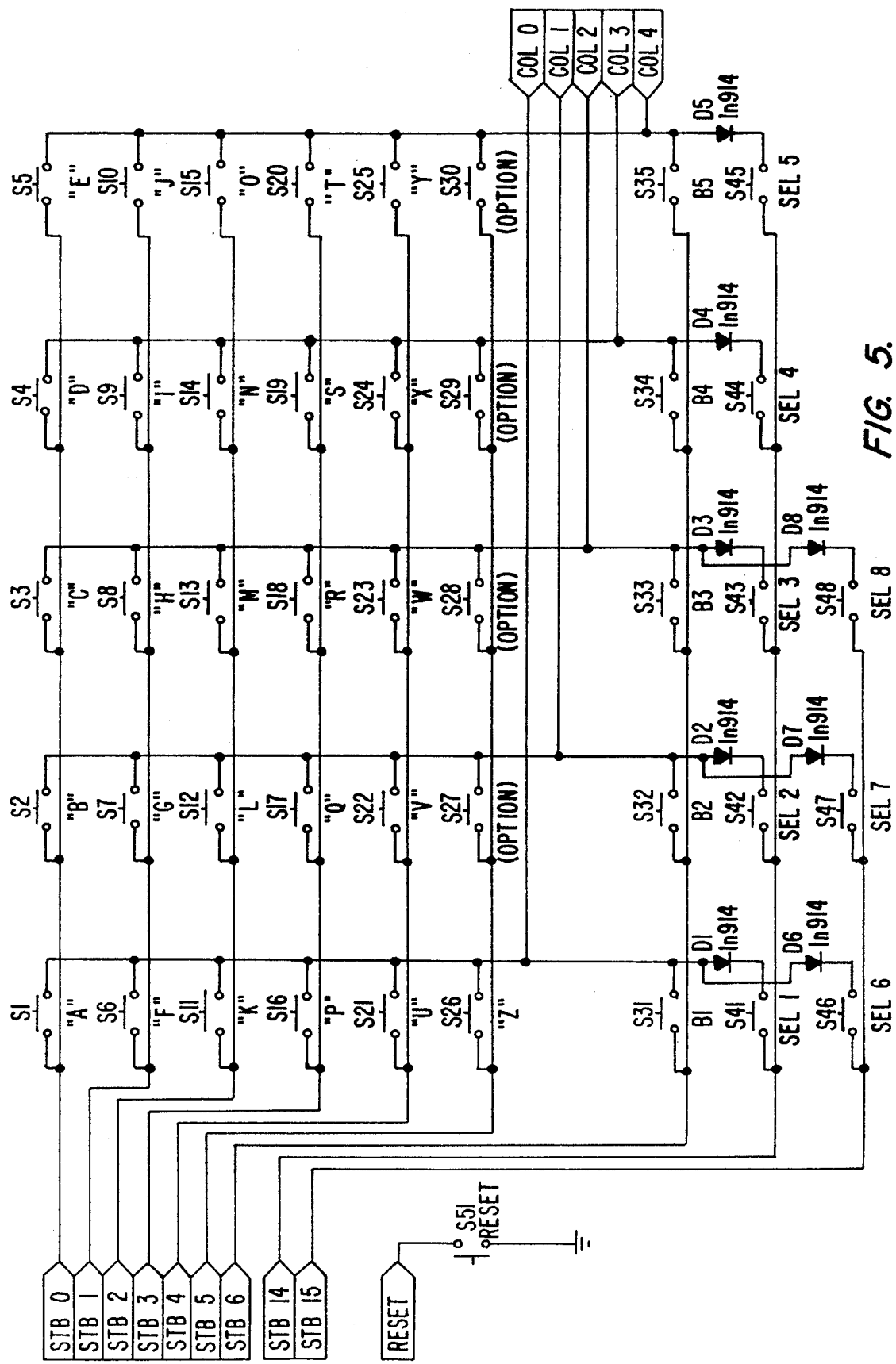
FIGS. 5 and 6 depict one implementation of the speech processor circuitry of the present invention.
Figure 6:
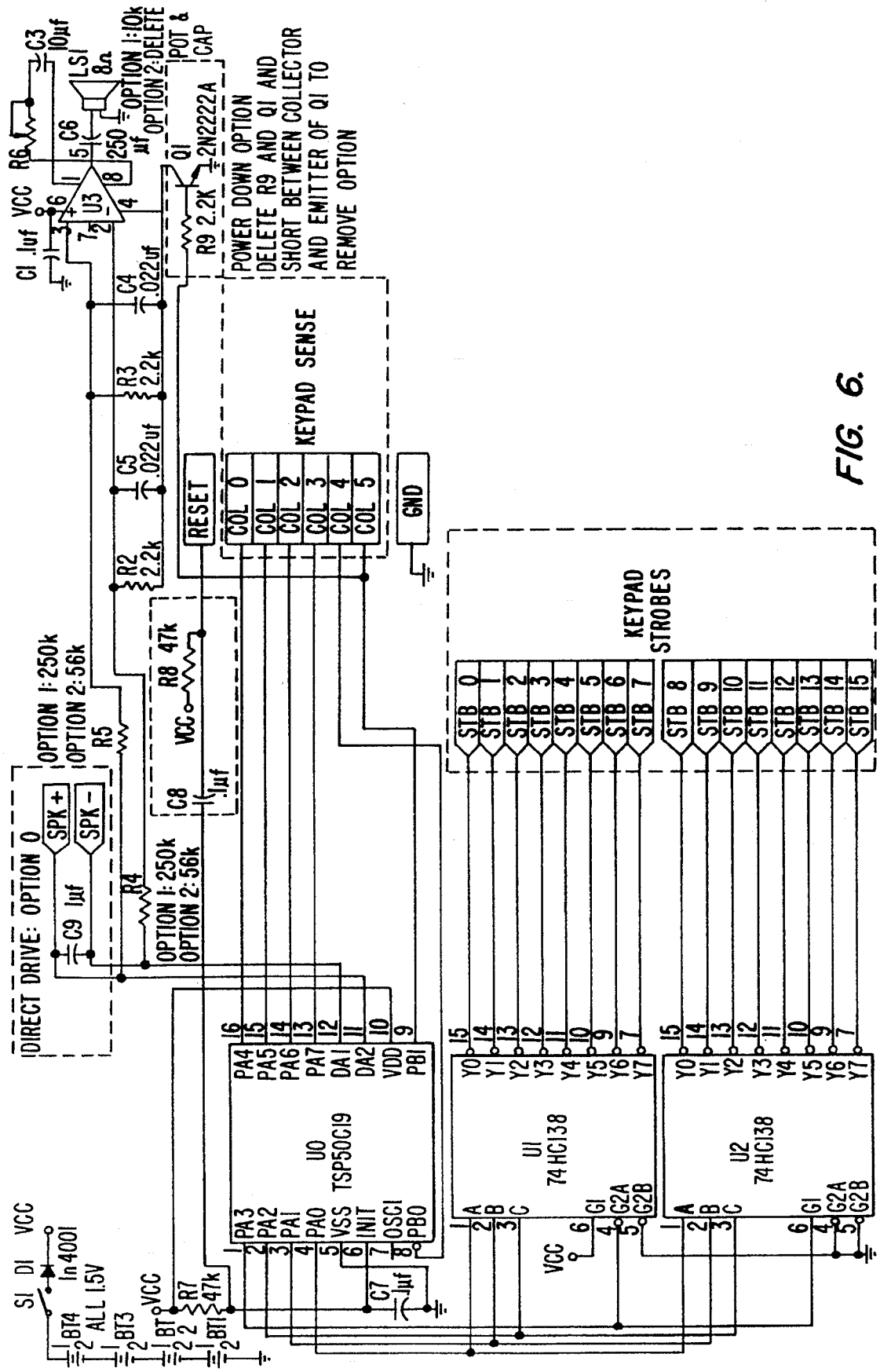

Turning attention now to FIGS. 5 and 6 the speech processor circuitry employed in the FIG. 1 embodiment of the present invention is described. The speech processor responsible for the bulk of the work is voice synthesizer chip TSP50C19, Texas Instruments Model No. TSP50C19, a linear predictive coding (LPC) voice synthesizer that can store 32K in memory. With 32K in memory roughly 150 words may be stored, in addition to their phonemes, which are separately stored from the words. Additional memory may be added to this chip, with suitable design modifications.

The voice synthesizer chip TSP50C19 is connected to 8 ohm speakers through pins 11 and 12. Pins 1–4, 8, 9 and 13–16 lead to the pins that control the switches that lie under the five keys on the right hand portion of the book or the under the letters of the alphabet on the left hand portion.

The switches are arrayed on a standard matrix of pin leads, with five columns, represented by pins COL 0–COL 5, and a maximum of 16 rows, represented by pins STB 0–STB 15. In theory this arrangement will allow up to 96 key pad sensor switches to be supported. In the FIG. 1 embodiment, a total of 26 letters of the English alphabet, and optionally such phonetics and digraphs as the "silent e", some short vowels and hard consonants have keys associated with them may be supported. In addition, some indicia bearing units representing some principal colors may be supported, on the left hand side of the book. By depressing any one of the keys, the phonic associated with the key will be recited.

Pins STB 14 and STB 15 go to the card identifying portion of the circuit, and receive input from the eight diode shunted switches that are connected to either the eight pins (FIG. 1 embodiment) or keys (FIG. 2A embodiment) of the card receiving portion, that identifies the card, as explained more fully herein.

The values of the components making up FIGS. 5 and 6 are as shown in the drawings and can be summarized as follows, where k=kilo-ohms, uf=micro-farads, V=volts, model numbers refer to component model numbers, and letters refer to components, with the prefix letters designating components as follows: D=diodes, BT=batteries, C=capacitors, S=switches; R=resistors, Vcc=power supply voltage, Q=transistors (npn), U=other component chips.

There are several optional configurations of the circuit, which can be generally describes as follows. Regarding the speaker, Option 0 is defined when the speaker is driven directly by the speech processor; Option 1 is defined if there is a fixed gain amplified speaker driven by the speech processor; Option 3 is defined when there is a user-adjustable variable gain amplified speaker driven by the speech processor. The keypad options are as follows: (1) continuous reset (2) extended keypad options. The power management options includes a amplifier power down mode. A power down (sleep) option for the device is desirable, in order to conserve power. In the power down option resistor R9 and transistor Q1 are deleted (open circuit), while to maintain the power down option the collector and emitter portions of Q1 are shorted. The power down option is necessary to conserve battery life because while the speech synthesizer chip (TSP50C19) is programmable to power down, the speaker(s) and op amp will continue to consume power.

Referring to FIG. 5 and 6, BT1–BT4=1.5 V; D1=1n4001; C1=0.1 uf; C3=10 uf; C4, C5=0.022 uf; C6=250 uf; C7=0.1 uf; C8=0.1 uf; C9=1.0 uf; R4, R5=250 k (Option 1) or 56 k (Option 2); R2, R3=2.2 k; R6=10 k (log taper potentiometer Option 1; delete potentiometer and cap Option 2); R7=47 k; R8=47 k; SPK+, SPK– connect to 8 Ohm speakers (optional); Op Amp LM386; U0=TSP50C19; U1, U2=74HC138; Q1=2N2222A. L51 (speaker, 8 Ohm).

For speaker Option 0: delete U3, C1, C3–C6, R2–R6, R9, Q1. Add C9, change LS1 from 8 to 30 ohm.

It should also be noted that the reset and continuous reset options are options to initialize the processor when a card is inserted onto the card receiving portion of the book, to start the program that the processor employs to have the word and/or phonic associated with the card spoken, and to voice the phonic associated with the keys, when the keys are depressed. In reset mode the reset is done by the manual activation of a switch every time the card is deployed onto the card receiving portion or template, while in the continuous reset mode the processor can be reset more readily mechanically, without the need of a separate switch. Thus with the continuous reset option delete C8 and R8 and short C8. In the reset option the pin labeled "reset" is an inverted logic pin.

It should be further noted that the speech processor chip of the present invention, TSP50C19, is software programmable. In general, however, any type of circuitry or chip may be employed.

Furthermore, the circuitry may be modified by a skilled artisan to incorporate the other features described and taught herein.

The foregoing description is offered for illustrative purposes only. Numerous modifications and variations may be readily apparent to those skilled in the art, while still falling within the spirit and scope of the invention as claimed herein below.

What is claimed is:

1. An interactive learning device comprising:
   a plurality of indicia bearing units, each unit having a three-dimensional configuration;

an indicia bearing housing for housing said plurality of indicia bearing units, and a plurality of switches;

a sound synthesizer processor housed in said indicia bearing housing and electrically coupled to said plurality of switches, said processor having a memory for storing a plurality of sounds each associated with a different one of said plurality of indicia bearing units;

a sound transducer driven by said processor; and a card having a series of indicia outlines cutouts formed therein, each said outline cutouts being shaped to receive a corresponding one of said indicia bearing units, said card sized to fit in said indicia bearing housing with said outlines cutouts overlying said plurality of switches and having means for identifying the card to said processor;

said processor having means for recognizing said card identifying means and means for associating said indicia outlines cutouts with said plurality of switches based on the card identity;

wherein each of said switches, when activated, causes said processor to drive said speaker to produce an associated sound whenever an indicia bearing unit is fit into the corresponding indicia outline cutouts.

2. The interactive learning device according to claim 1, wherein both said indicia outlines cutouts and said indicia bearing units are in the form of letters in a word, and said associated sound produced by said speaker is the corresponding phoneme associated with said word.

3. The interactive learning device according to claim 2, wherein said indicia bearing housing is made of plastic, and in the form of an open book having opposite sides, with said indicia bearing units held on one side of said book and said card held on the other side of said book.

4. The interactive learning device according to claim 3, wherein said processor stores in said memory the phonics associated with said word in both the English language and at least one other language, and said processor drives said speaker to produce said phonics in both said English and other languages.

5. The interactive learning device according to claim 1, wherein said card identifying means are a plurality of holes in said card, and said indicia bearing housing has a plurality of pins to receive said holes, and said pins are operably connected to said processor circuit.

6. The interactive learning device according to claim 5, wherein said indicia outlines cutouts are in the form of letters in a word, and said associated sound produced by said speaker is the phoneme associated with said word.

7. The interactive learning device according to claim 1, wherein said identifying means are a plurality of apertures on the edge of said card, and said indicia bearing housing has a plurality of keys to receive said apertures on the edge of said card, and said keys are operably connected to said processor.

8. The interactive learning device according to claim 7, wherein said indicia outlines cutouts are in the form of letters in a word, and said associated sound produced by said speaker is the phoneme associated with said word.

9. The interactive learning device according to 1, wherein said processor drives said sound transducer to produce an identifying sound whenever said card is placed in said indicia bearing housing.

10. The interactive learning device according to claim 9, wherein said indicia bearing units are arranged in the form of letters of the alphabet.

11. The interactive learning device according to claim 9, wherein said indicia bearing units are arranged in the form of animals.

12. The interactive learning device according to claim 1, wherein both said indicia outlines cutouts and said indicia bearing units are in the form of shapes of animals, and said associated sound produced by said sound transducer is the characteristic sound associated with said animals.

13. The interactive learning device according to claim 12, wherein said indicia bearing housing is made of plastic, and in the form of an open book having opposite sides.

14. The interactive learning device according to claim 12, further comprising a switch housed on said indicia bearing housing that is operatively connected to said processor to operate said processor to recite a description of said animals in at least two languages.

15. The interactive learning device according to claim 1, wherein said indicia housing is shaped in the form of a book having first and second sides; wherein said card is capable of being removably stored on said first side of said book; and wherein said indicia bearing units are stored in said outlines in said card.

16. The interactive learning device according to claim 1 wherein said indicia outlines cutouts are in the form of animal shapes.

17. The interactive learning device according to claim 16 wherein said associated sound comprises a characteristic animal noise.

18. The interactive learning device according to claim 16 wherein said associated sound comprises the pronunciation of the name of the animal.

19. The interactive learning device according to claim 1 wherein said processor further includes means for causing the transducer to generate said associated sound when the corresponding one of said indicia bearing units is removed from one of said indicia outlines cutouts.

20. The interactive learning device according to claim 1 wherein said processor further includes means for causing the transducer to generate a sound associated to said card after said card is recognized by said processor.

21. The interactive learning device according to claim 20 wherein said series of indicia outlines are letters of the alphabet forming a word; and wherein said sound associated to said card includes the pronunciation of the word.

22. The interactive learning device according to claim 21 wherein said associated sound comprises the sound of the corresponding letter of the alphabet.

23. The interactive learning device according to claim 21 wherein said processor further includes means for generating said sound associated to said card whenever the indicia bearing units have been fit into said series of indicia outlines to correctly spell the word.

24. An educational apparatus comprising:

A housing shaped to open into a book, said housing having two sides when laid open;

a processor housed by the housing, the processor capable of synthesizing sounds and electrically coupled to a sound transducer;

a first set of indicia located on one side of the book, each of these indicia overlying a first plurality of switches that are electrically coupled to the procesor, the processor being capable of associating each switch with a particular indicia and a corresponding sound; and a card having a second set of indicia cutouts depicted thereon, the card received by the other side of the book and having means recognizable by the processor for identifying the card, said processor being capable of recognizing said card identifying means, wherein a user may depress at least some of the switches underlying the first set of indicia to cause the processor to drive the transducer to emit a sound associated with the second set of indicia cutouts.

25. The educational apparatus according to claim 24, wherein the indicia are in the form of three-dimensional indicia carrying units, with these units represent indicia selected from the group consisting of letters of the alphabet, numbers, digraphs, animals, colors, and geometrical shapes, with these units detachably secured to the underlying switches.

26. The educational apparatus according to claim 24, further comprising a second plurality of switches on the side of the book for receiving the card, said second plurality of switches underlying that portion of the card bearing the second set of indicia cutouts when the card is received by the other side of the book, the second set of indicia cutouts comprising a plurality of cutouts sized to receive at least some of said first set of indicia, wherein the processor drives the transducer to generate a sound associated with a given indicia whenever that indicia is inserted into a corresponding cutout from said plurality of cutouts to thereby depress one of said second plurality of switches.

27. The educational apparatus according to claim 24 wherein said first set of indicia comprises a plurality of numeral keys and function keys of a calculator; and wherein said second set of indicia cutouts comprises a collection of symbols stating a mathematical problem to be solved.

28. The educational apparatus according to claim 27, wherein said processor includes means for causing the transducer to generate sounds which state the mathematical problem when said card is recognized by said processor.

29. The educational apparatus according to claim 28 wherein said processor further includes means for causing the transducer to generate sounds which additionally state the solution to the mathematical problem when said card is recognized by said processor.

30. The educational apparatus according to claim 27 wherein said processor further includes means for causing the transducer to generate sounds which state the numerals and functions corresponding to the numeral keys and function keys associated to the mathematical problem when said card is recognized by said processor.

31. The educational apparatus of claim 24 wherein said first set of indicia are removably received in individual recesses formed in said one side of the book.

32. The educational apparatus according to claim 31 wherein said second set of indicia cutouts includes a plurality of indicia cutouts units formed in said card and associated to said first set of indicia.

33. The educational apparatus according to claim 32 wherein said plurality of indicia cutouts units are in the form of letters of the alphabet.

34. The educational apparatus according to claim 32 wherein said plurality of indicia cutouts units are in the form of individual phonemes.

35. The educational apparatus according to claim 32 wherein said plurality of indicia cutouts are in the form of geometrical shapes.

36. The educational apparatus according to claim 24 wherein said processor further includes means for causing the transducer to generate a sound associated to said card after said card is recognized by said processor.

37. The educational apparatus according to claim 36 wherein said second set of indicia cutouts comprises letters of the alphabet forming a word; and wherein said sound associated to said card includes the pronuncuation of the word.

38. The educational apparatus of claim 37 wherein said associated sound comprises the sound of the corresponding letter of the alphabet.

* * * * *